United States Patent [19]

Bowen

[11] Patent Number: 4,525,228

[45] Date of Patent: Jun. 25, 1985

[54] METHOD OF WINDING ON FOAM MANDREL

[75] Inventor: Dennis H. Bowen, North Stoke, England

[73] Assignee: United Kingdom Atomic Energy Authority, London, England

[21] Appl. No.: 520,234

[22] Filed: Aug. 4, 1983

[30] Foreign Application Priority Data

Aug. 13, 1982 [GB] United Kingdom ............... 8223388

[51] Int. Cl.³ ............................................ B65H 81/00
[52] U.S. Cl. .................................. 156/155; 156/172; 156/173; 156/211
[58] Field of Search ............... 156/173, 175, 172, 194, 156/169, 166, 155, 156, 425, 220, 211; 242/187 R; 264/131, 101, 102, 257, 258, 317

[56] References Cited

U.S. PATENT DOCUMENTS

| | | | |
|---|---|---|---|
| 3,551,237 | 12/1970 | Cox et al. | 156/175 |
| 3,567,541 | 3/1971 | Kacersenski | 156/172 |
| 3,850,722 | 11/1974 | Kreft | 156/172 |
| 3,873,654 | 3/1975 | Smith | 244/123 |
| 3,943,020 | 3/1976 | Ashton et al. | 156/156 |
| 4,123,307 | 10/1978 | Lemelson | 156/156 |

FOREIGN PATENT DOCUMENTS 1537559 12/1978 United Kingdom .

Primary Examiner—Michael Ball
Attorney, Agent, or Firm—William R. Hinds

[57] ABSTRACT

A mandrel is provided for use on a filament winding machine in a process for making a fibre-reinforced plastic artifact. The mandrel 50 comprises a portion 66 of relatively low density cellular material such as foamed polyurethane about a stiff axial spine member 54. The mandrel 50 is therefore relatively light weight and yet is of sufficient rigidity for use on a filament winding machine. After formation of an artifact by winding on the mandrel 50, the mandrel 50 may be removed from inside the artifact by comminution.

An alternative mandrel comprises a number of sections of the cellular material, and enables an artifact having a re-entrant surface to be formed by a filament winding process. A layer of resin-impregnated filaments is wound around the mandrel, and the layer is partially cured. A section of the mandrel is then removed by comminution, and the layer is deformed to the shape of the remainder of the mandrel.

11 Claims, 10 Drawing Figures

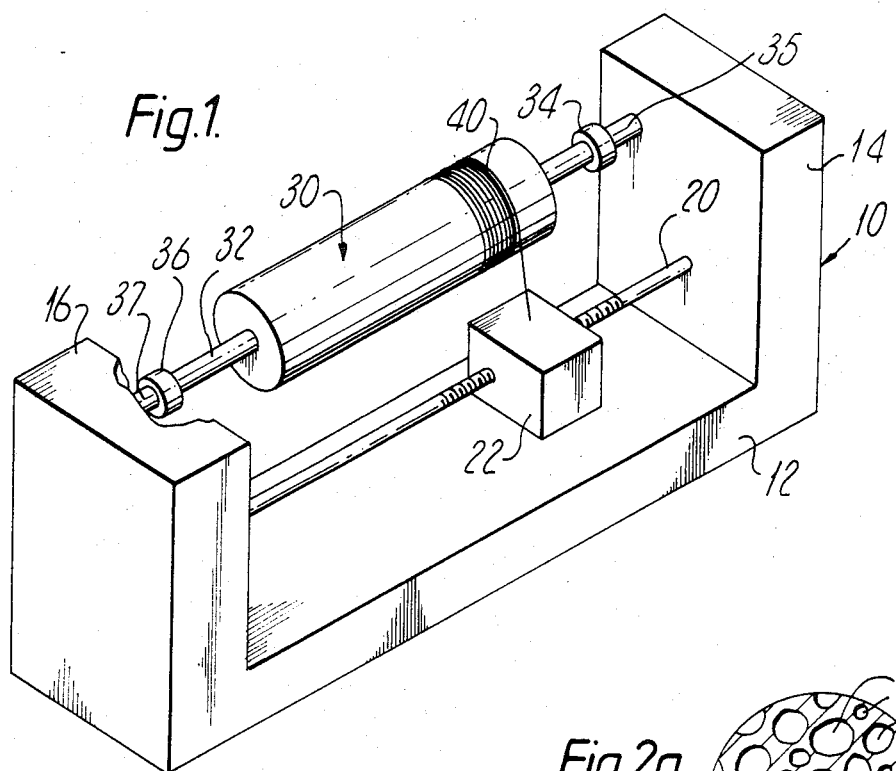
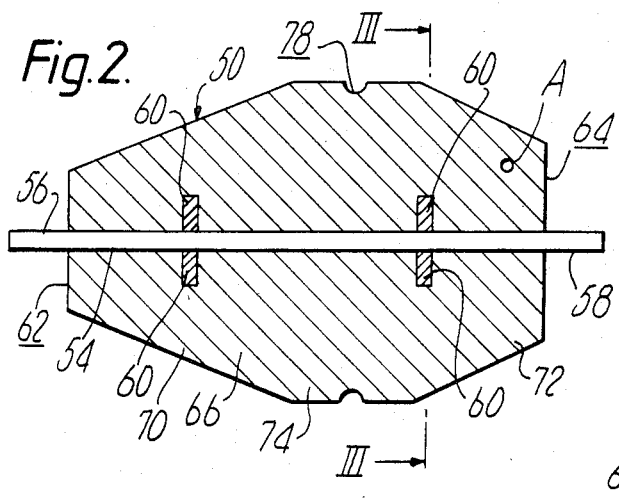
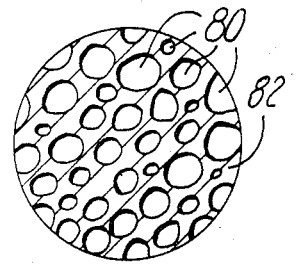
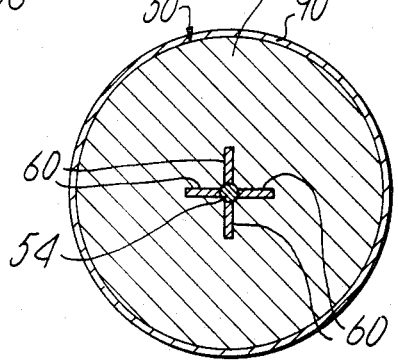

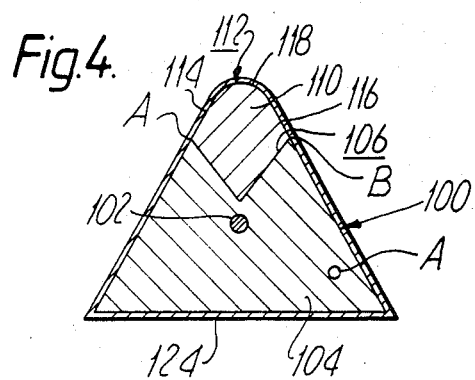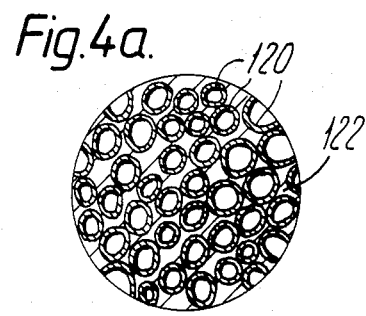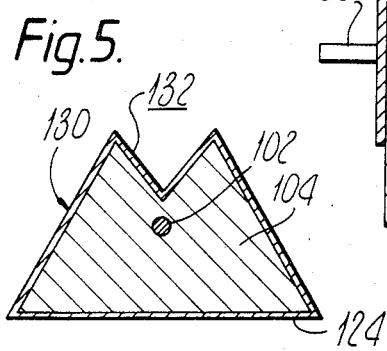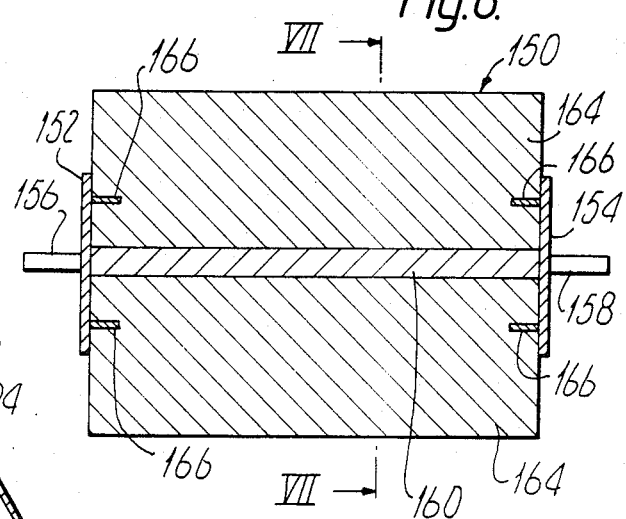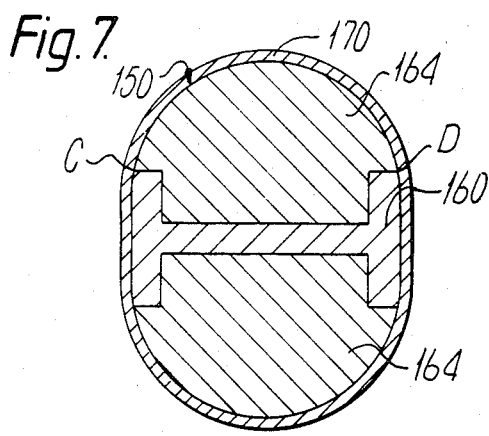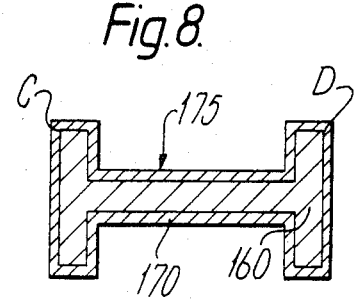

METHOD OF WINDING ON FOAM MANDREL

This invention relates to filament winding in which fibres are wound onto a mandrel and impregnated with a resin to form a fibre-reinforced plastics artefact.

Once the resin is cured (which may for example necessitate heat treatment) it is usually necessary to remove the mandrel from inside the artefact. If the artefact is for example tubular with open ends, the mandrel may simply be withdrawn in one piece through one end of the artefact. For artefacts having a more complex internal shape it may be necessary to dismantle the mandrel into smaller component parts each of which is small enough to be withdrawn from inside the artefact, but of course this adds to the complexity of the mandrel. It is also known to make mandrels of a material which can subsequently be removed by dissolution in a suitable solvent from inside the artefact, but in the case of large artefacts this dissolution may take considerable time. Foam materials have been considered unsuitable for use as mandrels because of their low strength, as stated for example on page 249 of "SPI Handbook of Technology and Engineering of Reinforced Plastics/Composites", 2nd Edition, by J. G. Mohr et al, published by Van Nostrand Reinhold Co., 450 West 33rd Street, New York, N.Y. referred to herein as the "SPI Handbook", and incorporated by reference herein.

According to the present invention, a method of producing a fiber-reinforced plastics artefact comprises the operations of winding filaments onto a mandrel, the filaments being impregnated with a resin and the resin subsequently being cured, wherein the mandrel comprises relatively low density cellular material about a stiff axial spine member, and the method further comprises the operation of removing at least part of the mandrel cellular material from within the artefact after the resin has been partly cured, causing the resin impregnated filaments to conform to the shape of the remaining part of the mandrel, and then completing the curing of the resin. The mandrel may comprise a plurality of sections, each comprising relatively low density cellular material, and the removal step may comprise removing a section of the mandrel. The removing may be by comminution of the cellular material.

The cellular material may comprise a foamed material, which may for example be polyurethane foam or phenolformaldehyde foam. Alternatively the cellular material may comprise a multiplicity of hollow capsules bonded together by a binder.

The method may include the further steps of removing the mandrel from within the artefact by comminution of the cellular material.

The mandrel may define at least one groove in the outside surface thereof, for producing a hollow fibre-reinforced plastics artefact with a corresponding internal ridge, and the groove in the mandrel may for example be circumferential, longitudinal, or be defined by opposing helical grooves. The resulting ridge on the inside surface of the artefact may fulfil a variety of functions, for example to provide internal ribs to strengthen or stiffen the artefact in appropriate directions. Alternatively, the mandrel might support an insert, such as an internal flange, to be incorporated in the artefact as the filaments are wound. The artefact might, however, be of open-lattice structure, the elements of the lattice having a cross-section and a path defined by the grooves in the mandrel, and the grooves might be along geodesic lines or along non-geodesic lines.

It will be understood that the filaments may be impregnated with resin either before, during, or after being wound onto the mandrel.

The invention will now be further described by way of example only and with reference to the accompanying drawings in which:

FIG. 1 is a diagrammatic perspective representation of a filament winding machine;

FIG. 2 is an axial sectional view of a mandrel for use in the machine of FIG. 1;

FIG. 2a is an enlarged representation of the portion of the mandrel of FIG. 2 within the circle A;

FIG. 3 is a view on the line III—III of FIG. 2;

FIG. 4 is a cross-sectional view of an alternative mandrel to that of FIG. 2;

FIG. 4a is an enlarged representation of the portion of the mandrel of FIG. 4 within the circle A;

FIG. 5 is a cross-sectional view of an artefact made using the mandrel of FIG. 4;

FIG. 6 is an axial sectional view of another alternative mandrel to that of FIG. 2;

FIG. 7 is a view on the line VII—VII of FIG. 6; and

FIG. 8 is a cross-sectional view of an artefact made using the mandrel of FIG. 6.

Referring to FIG. 1, a filament winding machine 10 comprises a base member 12 and opposed end members 14 and 16. A lead screw 20 extending between the end members 14 and 16 engages a filament-dispenser 22 movable along the base member 12. A mandrel 30 with a central steel shaft 32 is mounted between a headstock 34, supported by a rotatable shaft 35 located in the end member 14, and a tail-stock 36 supported by a shaft 37 freely rotatable in the end member 16. In operation of the filament winding machine 10, the mandrel 30 is rotated by an electric motor (not shown) connected to the shaft 35, and the electric motor through suitable gearing simultaneously causes the lead screw 20 to rotate thereby causing the filament-dispenser 22 to move along the lead screw 20 and to wind a filament 40 (e.g. carbon fibres) around the mandrel 30.

Referring now to FIGS. 2 and 3 a mandrel 50 is shown which comprises a straight steel shaft 54 with exposed end portions 56 and 58 respectively for mounting between the headstock 34 and the tail-stock 36 of the filament winding machine 10 of FIG. 1. Two sets of four equally spaced radially extending vanes 60 project from the shaft 54 and provide a key to prevent relative rotation of the shaft 54 with respect to a mandrel portion 66 formed by injection moulding low density foamed polyurethane around the shaft 54. The mandrel portion 66 has plane end surfaces 62 and 64 and extends coaxial to the shaft 54 between the end portion 56 and the end portion 58. The mandrel portion 66 comprises two truncated right conical portions 70 and 72 whose bases are joined by a cylindrical portion 74. A circumferential groove 78 around the cylindrical portion 74 is formed by subsequent milling. The mandrel portion 66 is of density 50 kg/m$^3$ and consists (as shown diagrammatically in FIG. 2a) of bubbles 80 of gas in a matrix 82 of polyurethane.

In use of the mandrel 50 to make a fibre-reinforced plastics artefact, the mandrel 50 is mounted into the filament winding machine 10 of FIG. 1 and a layer 90 of resin-impregnated filaments (see FIG. 3) is wound onto the curved surface of the mandrel portion 66 leaving the plane end surfaces 62 and 64 exposed. The curved surface of the mandrel portion 66 thus determines the shape of the internal surface of the artefact. The resin is then cured by heat treatment to a temperature of 160° C., causing the layer 90 to harden. The mandrel 50 can then be removed from inside the artefact by comminution of the foamed polyurethane of the mandrel portion 66, for example by crushing or by using an electric drill (not shown).

Although the shaft 54 is described as having vanes 60 extending radially from it, it will be understood that in some circumstances no positive keying between the shaft 54 and the mandrel portion 66 is required, and the vanes 60 can be dispensed with. It will also be understood that where a hollow artefact is not required, the shaft 54 may be removed from the mandrel 50 after formation of the artefact, leaving the foamed polyurethane inside the artefact, with little resultant increase in weight of the artefact. Retention of the foamed polyurethane might also improve the resistance of the artefact to failure as a result of buckling under compressive loads.

If desired, inserts (e.g. a fibre reinforced plastics internal flange) may be supported by the mandrel of the invention so as to be overwound by the layer 90 of filaments and incorporated in the artefact. Although a circumferential groove 78 has been shown in FIG. 2, alternative grooves such as opposing helical grooves may be provided. When an open lattice artefact is to be produced, the filaments 40 can be laid only in the grooves, and the grooves might follow geodesic or non-geodesic lines. Where protuberances produced by intersecting filaments 40 at intersecting grooves are undesirable, the mandrel may be relieved locally at these intersections and the filaments 40 subsequently depressed into these relieved portions of the mandrel.

As an alternative to using a unitary mandrel, a mandrel comprising a number of sections may be used, for example as shown in FIG. 4.

Referring to FIG. 4, an alternative mandrel 100 is shown which comprises a steel shaft 102 which can be mounted between the headstock 34 and the tail-stock 36 of the filament winding machine 10 of FIG. 1. The shaft 102 extends along the axis of a prism-shaped mandrel portion 104 generally triangular in cross-section but with a V-groove 106 along one edge. A second mandrel portion 110 fits into the groove 106, and its exposed surface 112 consists of two plane surfaces 114, 116 each coplanar with the adjacent surface of the mandrel portion 104 and which converge to a convex curved surface 118. The shape of the second mandrel portion 110 is such that the distance along the surface of the groove 106 between vertexes A and B on either side of the groove 106 is the same as the distance between A and B along the exposed surface 112 of the second mandrel portion 110.

The second mandrel portion 110 is of low density foamed polyurethane; while the mandrel portion 104 (as shown diagrammatically in FIG. 4a) is of hollow glass "micro-spheres" 120 bonded together by a polyester resin 122, and injection moulded around the rod 102.

In use of the mandrel 100 to make a fibre reinforced plastic artefact 130 shown in FIG. 5, the mandrel 100 is mounted onto the filament winding machine 10 of FIG. 1, and a layer 124 of resin-impregnated filaments (e.g. glass fibres) is wound around the mandrel 100 so as to envelope the mandrel portion 104 and the exposed surface 112 of the second mandrel portion 110. The layer 124 is then subjected to a controlled heat treatment to partially cure the resin. This treatment renders the layer 124 sufficiently rigid for the second mandrel portion 110 to be removed by comminution from inside the layer 124, as described with reference to the mandrel 50 of FIG. 2.

The layer 124 is then heated sufficiently to soften the resin, and so allow the layer 124 to be deformed to conform to the shape of the groove 106 in the mandrel portion 104. The layer 124 is finally cured and consolidated by vacuum bag moulding, to produce the artefact 130 having the shape of the mandrel portion 104, as shown in FIG. 5. The process of vacuum bag moulding is described on pages 77 to 94 of the "SPI Handbook" to which reference may be made. Essentially, in vacuum bag moulding, the layer 124 and mandrel portion 104 are surrounded by a flexible air-tight bag (not shown) which is evacuated so that the layer 124 is compressed by atmospheric pressure, while simultaneously the layer 124 is heated by a radiant heater (not shown). It will be understood that the shaft 102 and the mandrel portion 104 may subsequently be removed from inside the artefact 130 if desired.

It will be appreciated that artefacts having more than one re-entrant or concave surface may be made using appropriately shaped mandrels, and in FIGS. 6 and 7 (to which reference is now made) is shown a mandrel 150 for making a fibre reinforced foam-filled plastics I-beam 175 shown in FIG. 8. The mandrel 150 includes two circular steel end plates 152 and 154, and extending axially from each end plate 152 and 154 is a stub axle 156 and 158 respectively by means of which the mandrel 150 may be mounted between the headstock 34 and the tail-stock 36 of the filament winding machine 10 of FIG. 1. Extending along the longitudinal axis of the mandrel 150 between the end plates 152 and 154 is a relatively stiff former 160, I-shaped in cross-section, of "high density" foamed polyurethane of density 400 kg/m$^3$. On either side of the former 160 is a mandrel portion 164 of low density foamed polyurethane, of density 50 kg/m$^3$, of generally hemicylindrical form, shaped such that the distance between the points on the former marked C and D (see FIGS. 7 and 8) along the curved surface of the mandrel portion 164 is equal to the distance from C to D along the surface of the former 160. Attached to each end plate 152 and 154 are two steel spikes 166 extending parallel to the longitudinal axis of the mandrel 150 and embedded in the ends of the mandrel portions 164.

In use, the mandrel 150 is mounted onto the filament winding machine 10 of FIG. 1, and a layer 170 of resin impregnated filaments (see FIG. 7) is wound around the mandrel 150 so as to envelope the outer surfaces of the flanges of the I-shaped former 160 and the curved surfaces of the mandrel portions 164. The layer 170 is then subjected to a controlled heat treatment to partially cure the resin, as described above with reference to the layer 124 of FIGS. 4 and 5. The end plates 152, 154 are removed, and then the mandrel portions 164 are removed by comminution from inside the layer 170. The layer 170 is then heated sufficiently to soften the resin and so allow the layer 170 to be deformed to conform to the surface of the former 160. The layer 170 is finally cured and consolidated by vacuum bag moulding to produce the I-beam 175 of FIG. 8. The "high density" foam former 160 may be left inside the I-beam 175 or alternatively it may be removed by comminution.

It will be appreciated that a mandrel of the invention may be formed in alternative shapes and sections to those aforedescribed, and might for example comprise several axially aligned sections held together to define a desired overall shape, for example to support a selected insert to be incorporated in the mandrel. It will also be understood that other cellular materials may be used, and that a wide range of densities and compressive strengths are thereby available. Typical foam densities range between 30 and 600 kg/m$^3$. For example foamed phenolformaldehyde may be used, or foam comprising hollow ceramic or polymer spheres bonded together by a synthetic resin or an inorganic cement may be appropriate in particular circumstances. Consideration must be given to the density and mechanical strength of the foam, the effect of the resin-curing heat treatments on the foam, and the possibility of chemical reactions between the foam and the resin.

I claim:

1. A method of producing a fibre-reinforced plastics artefact, comprising the operations of winding filaments onto a mandrel, the filaments being impregnated with a resin and the resin subsequently being cured, wherein the mandrel comprises relatively low density cellular material about a stiff axial spine member, and the method further comprises the operation of removing at least part of the mandrel cellular material from within the artefact after the resin has been partly cured, causing the resin impregnated filaments to conform to the shape of the remaining part of the mandrel, and then completing the curing of the resin.

2. A method as claimed in claim 1, wherein the mandrel comprises a plurality of sections each comprising relatively low density cellular material, and said removing comprises removing a section of the mandrel.

3. A method as claimed in claim 1 wherein the mandrel supports an insert to be overwound by the filaments and incorporated in the artefact.

4. A method as claimed in claim 1 wherein the outside surface of the mandrel defines at least one groove, and the filaments are wound into the groove(s).

5. A method as claimed in claim 4 wherein the outside surface of the mandrel defines a plurality of intersecting grooves, and the filaments are wound into the grooves.

6. A method as claimed in claim 5 wherein the grooves follow geodesic lines on the mandrel.

7. A method as claimed in claim 5 wherein the grooves follow non-geodesic lines on the mandrel.

8. A method as claimed in claim 4, wherein the filaments are wound only into the groove or grooves.

9. A method as claimed in claim 5, wherein the filaments are wound only into the groove or grooves.

10. A method as claimed in claim 1 wherein said removing is by comminution of the cellular material.

11. A method as claimed in claim 2 wherein said removing is by comminution of the cellular material.

* * * * *